(No Model.)
J. McDONOGH.
CAR COUPLING.
No. 530,708. Patented Dec. 11, 1894.
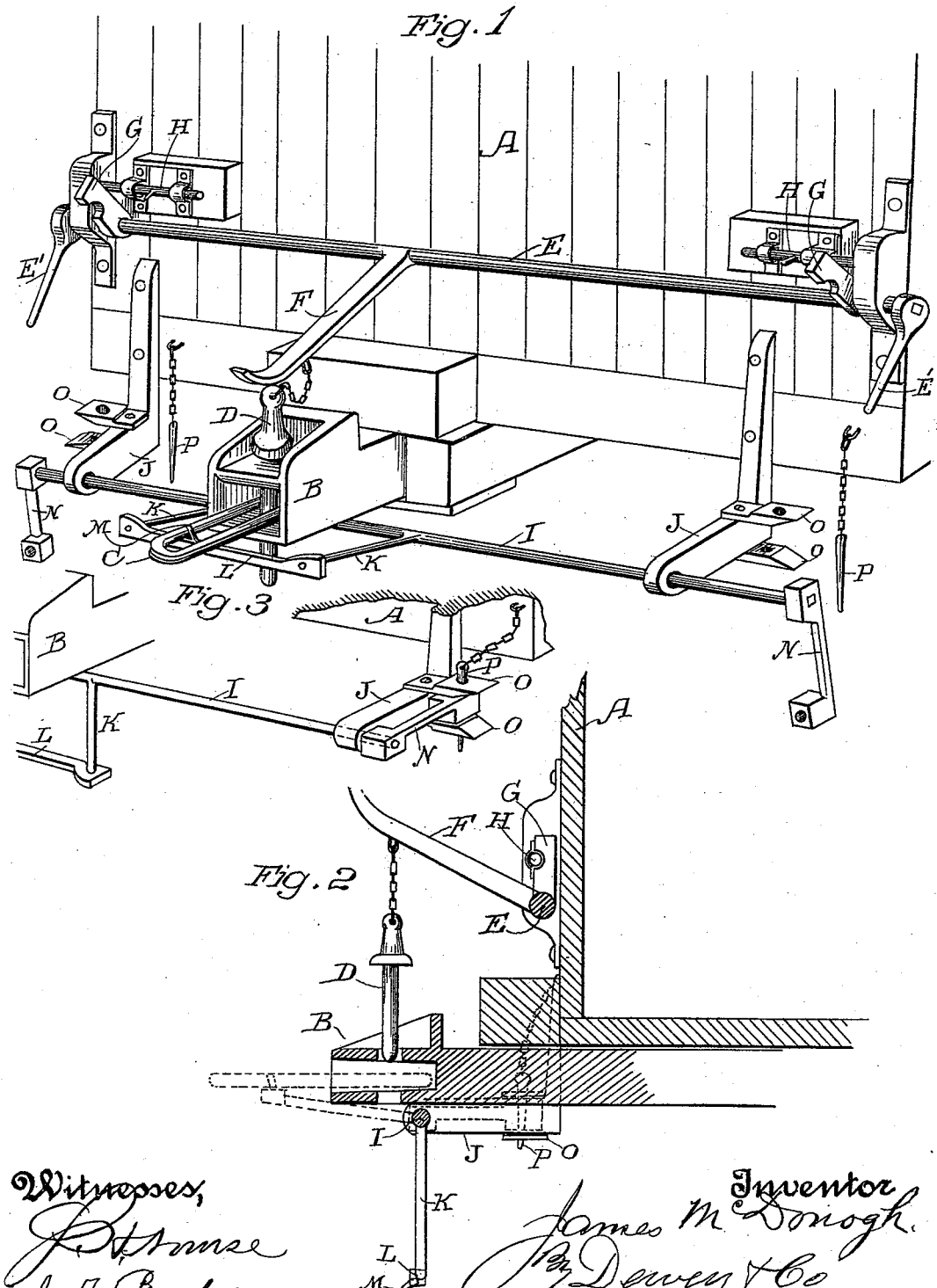
Witnesses,
P. H. Anmse
J. A. Bayless
Inventor
James McDonogh
By Dewey & Co
Attys

UNITED STATES PATENT OFFICE.

JAMES McDONOGH, OF SAN FRANCISCO, CALIFORNIA.

CAR-COUPLING.

SPECIFICATION forming part of Letters Patent No. 530,708, dated December 11, 1894.

Application filed July 21, 1894. Serial No. 518,246. (No model.)

*To all whom it may concern:*

Be it known that I, JAMES MCDONOGH, a citizen of the United States, residing in the city and county of San Francisco, State of California, have invented an Improvement in Car-Couplings; and I hereby declare the following to be a full, clear, and exact description of the same.

My invention relates to improvements in car couplings, and it consists in certain details of construction which will be more fully explained by reference to the accompanying drawings, in which—

Figure 1 is a perspective view of my improved coupling. Fig. 2 is a vertical section of the same. Fig. 3 shows the manner of locking the shaft I.

The object of my invention is especially to provide means for coupling and uncoupling cars without the necessity of the operator passing between the cars.

In the present case A represents the end of the car; B, the draw-head through which the coupling is made.

C is a coupling link, and D is the coupling pin.

Across the end of the car is journaled a horizontal shaft E having an arm F extending outwardly from its center in line above the coupling pin. This arm has a chain connecting it with the head of the coupling pin, and the shaft is provided with crank arms E' at opposite ends, so that the shaft may be turned, and the lever arm F raised to withdraw the pin, or depressed to allow the coupling pin to drop through a link and connect the cars without the operator going between them at all. Upon the shaft E are two short arms G which turn with the shaft. When the lever F is raised so that the coupling pin is suspended with its point in the hole through which it falls to couple, these short arms lie against the end of the car, and either of them may be locked by means of a bolt H which can be moved to intercept the arms and prevent the shaft from rotating so as to allow the link to drop. After the link has been dropped, these bolts may be moved behind the arms H and the lever arm F, resting upon the head of the coupling pin, will be locked so that it cannot be raised and the pin cannot be withdrawn without withdrawing the bolts.

A fruitful source of difficulty in coupling cars is the direction of the link which projects from one coupling or draw-head, and must be entered into the other when the cars come together. In order to have perfect control over this I have shown a shaft I journaled in bearings J upon each side and below the draw-head as shown. From this shaft project arms K which are united across the front by a transverse bar L, and this bar has a pin M projecting from it which is adapted to engage the link when the shaft is turned so as to bring this bar upward and into contact with the link. Upon the ends of the shaft are arms M by which it is easily turned by an operator at either side of the car. The shaft is slidable endwise in its bearings, and when the cars are being coupled this shaft may be turned so as to bring the arm L with its pin into contact with the coupling link, and the link may be lifted and placed at any desired point to enter the opposite draw-head, or if the draw-heads do not happen to be exactly in line with each other, the link can be shifted from side to side by reason of the pin which enters between its sides, and the facility with which the shaft may be moved endwise in its bearings. This enables the operator to place the link in the exact position desired to enter the approaching draw-head. The coupling having been completed, the shaft is turned so that the lifting arm L will hang downwardly and out of the way, and in order to hold it in this position I have shown clasping arms O fixed to the supports of the shaft and projecting so that the ends of the lever arms N by which the shaft is turned, may either of them be pressed between these arms.

A hole is made through the arms O, and through the end of the lever arm N to correspond, and by passing a pin P through the hole the parts are locked together, and will remain in this position as long as may be desired. When the device is to be operated, it is only necessary to remove the pin, slide the shaft endwise until the crank arm is disengaged from the holding clasps, when the shaft may be turned so that the lifter will engage the link and place it wherever desired.

This device is applicable to any link coupling, and may be applied to any one of that class already in use, with but little expense.

Having thus described my invention, what I claim as new, and desire to secure by Letters Patent, is—

1. In a car coupling, the draw-heads having the link and pins by which the link is connected with opposing draw-heads, the bearing J upon each side and below the draw-head, having the clamping arms projecting laterally from the bearings, a transversely slidable rock-shaft journaled in the bearings having arms projecting from it and adapted to directly engage and lift the link and move the same laterally and crank arms upon the outer end of the shaft by which to operate it, said arms adapted to be forced between the clamping arms and means comprising pins passing through holes in the clamping arms and crank arms for locking said arms together, substantially as described.

2. In a car-coupling, a draw-head, a link connected therewith by a coupling pin, a shaft extending horizontally beneath the draw-head and slidable endwise in its bearings, arms projecting from said shaft having a transverse uniting bar provided with an upwardly extending pin adapted to enter the slot in the coupling link, and to engage the inner walls of said slot so as to move the link endwise, clamping arms on the shaft support having holes made through them, and arms on the outer ends of the shaft adapted to be forced between said clamping arms, and having holes adapted to coincide with the holes in the clamping arms, and a pin adapted to enter said holes and secure the arms whereby the link raising mechanism is held in a locked position out of the way.

In testimony whereof I have hereunto set my hand.

JAMES McDONOGH.

Witnesses:
S. H. NOURSE,
H. F. ASCHECK.